under 35 U.S.C. 154(b) by 105 days.

United States Patent
Huang

(10) Patent No.: US 8,047,730 B2
(45) Date of Patent: Nov. 1, 2011

(54) FOLDABLE SUPPORT DEVICE FOR CAMERA OF HANDWRITING DEVICE AND HANDWRITING DEVICE HAVING SAME

(75) Inventor: Shan-Fu Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 105 days.

(21) Appl. No.: 12/582,822

(22) Filed: Oct. 21, 2009

(65) Prior Publication Data

US 2010/0304350 A1    Dec. 2, 2010

(30) Foreign Application Priority Data

May 26, 2009    (CN) .......................... 2009 1 0302640

(51) Int. Cl.
*G03B 17/04*    (2006.01)
*G03B 21/06*    (2006.01)
(52) U.S. Cl. ......................................... 396/428; 353/65
(58) Field of Classification Search ............... 248/285.1, 248/286.1, 295.11, 296.1, 298.1, 396, 421, 248/431, 657, 669; 353/63–67; 355/63, 355/75; 396/5, 428
See application file for complete search history.

(56) References Cited

U.S. PATENT DOCUMENTS

| | | | | |
|---|---|---|---|---|
| 2,133,581 A | * | 10/1938 | Simmon | 355/63 |
| 2,625,075 A | * | 1/1953 | Baasner et al. | 355/56 |
| 4,527,766 A | * | 7/1985 | Krenz | 248/371 |
| 4,539,913 A | * | 9/1985 | Marchant | 108/7 |
| 4,915,496 A | * | 4/1990 | Stine | 352/69 |
| 7,427,983 B1 | * | 9/2008 | Hildebrandt et al. | 345/175 |
| 7,866,621 B1 | * | 1/2011 | Walters | 248/421 |
| 2005/0127253 A1 | * | 6/2005 | Kim | 248/176.1 |
| 2007/0035655 A1 | * | 2/2007 | Chen et al. | 348/373 |
| 2009/0002548 A1 | * | 1/2009 | Liang et al. | 348/373 |

\* cited by examiner

*Primary Examiner* — Clayton E Laballe
*Assistant Examiner* — Leon W Rhodes, Jr.
(74) *Attorney, Agent, or Firm* — Altis Law Group, Inc.

(57) ABSTRACT

A handwriting device includes a supporting device using two supporting arms. Each of the supporting arms is an elongated plate, includes a sliding end and an opposite pivoting end, and further includes an engaging surface. The sliding ends of the supporting arms are slidably engaged in two respective sliding channels defined in a supporting base. A cutout is defined in the engaging surface at the pivoting ends. A through hole is defined at each of the pivoting ends where the cutout is formed. The through holes of the supporting arms are aligned with each other. The supporting arms are rotatably connected with each other via a threaded bolt passing through the through holes of the supporting arms. As such, the height of a camera module supported by the supporting arms can be adjusted.

8 Claims, 5 Drawing Sheets

FOLDABLE SUPPORT DEVICE FOR CAMERA OF HANDWRITING DEVICE AND HANDWRITING DEVICE HAVING SAME

BACKGROUND

1. Technical Field

The present disclosure relates to supports and, particularly, to a support device for a camera of a handwriting device and the handwriting device. The support device and the camera can be folded when the camera is not in use.

2. Description of Related Art

Currently, a handwriting device using a camera to acquire writing of a pen (i.e., a stylus) on a board has been proposed. In the handwriting device, the camera is supported above the board, typically by a holding arm perpendicularly extending upwards from a side of the board, and aimed at the board to capture images of the entire board. This holding arm and the camera add substantially to the size of the handwriting device, making the handwriting device cumbersome when the handwriting device is not in use and difficult to be packed up and/or transported.

Therefore, it is desirable to provide a support device for a camera of a handwriting device and the handwriting device, which can overcome the above-mentioned problems.

DETAILED DESCRIPTION

Figure 1:
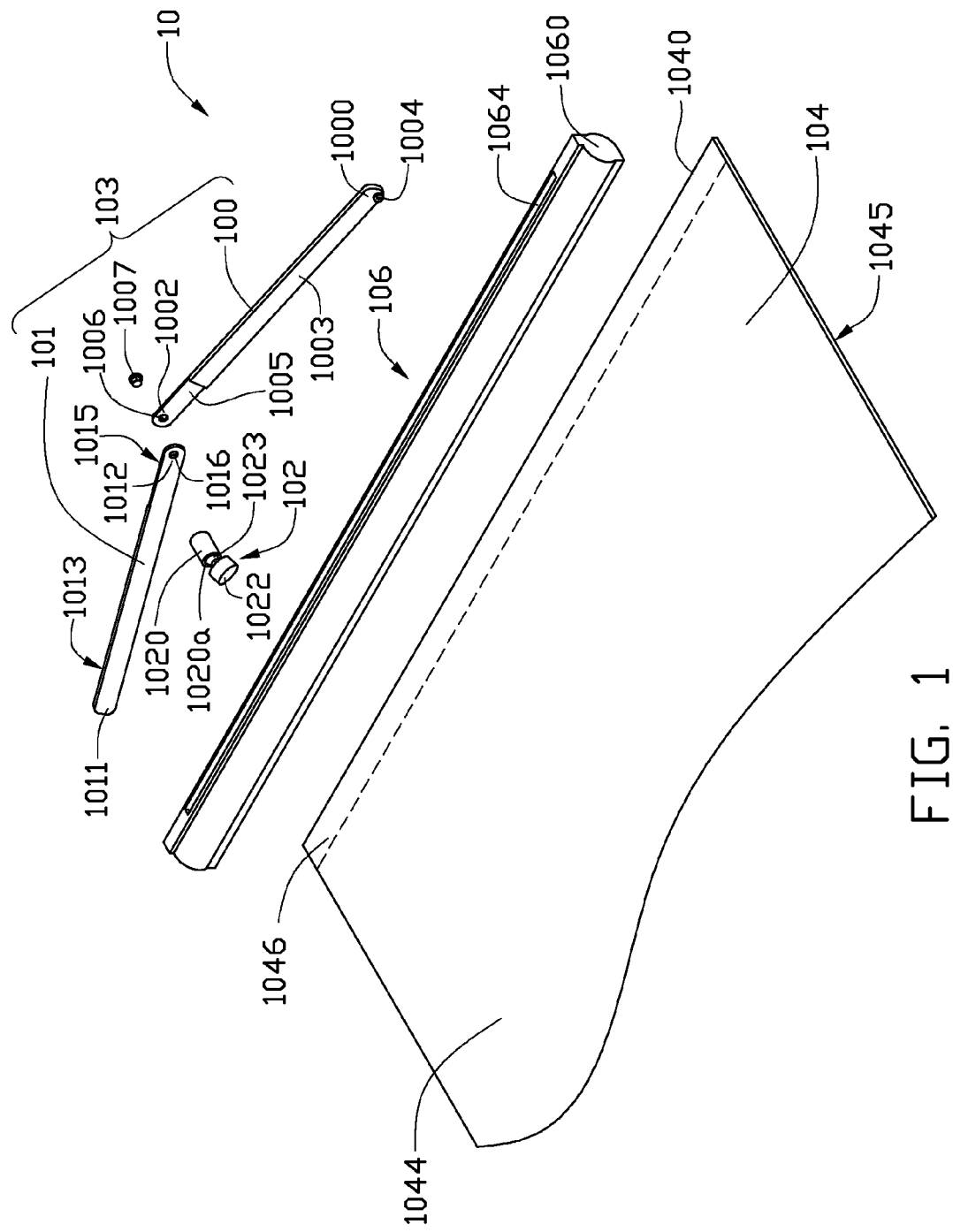
FIG. 1 is an exploded, isometric view of an exemplary embodiment of handwriting device.
Figure 2:
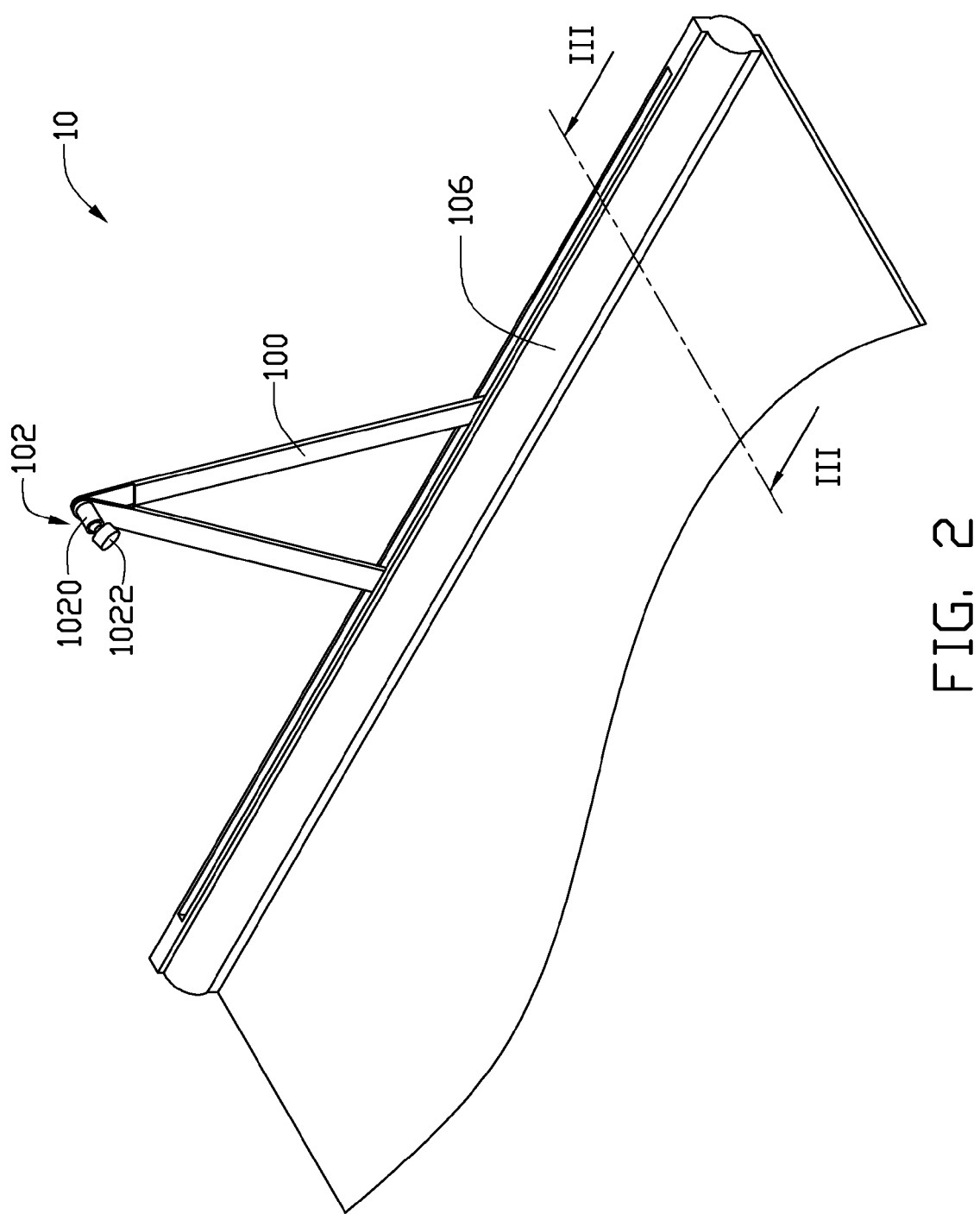
FIG. 2 is an assembled, isometric view of the handwriting device of FIG. 1 when the handwriting device is in use.

Referring to FIGS. 1 and 2, a handwriting device 10, according to an exemplary embodiment, is illustrated. The handwriting device 10 includes a writing board 104, a supporting device 103, and a camera module 102. The supporting device 103 includes a supporting base 106, a first supporting arm 100, a second supporting arm 101, and a threaded bolt 1007.

The writing board 104 is a rectangular plate, including a writing surface 1044 and a connecting side 1040. The writing surface 1044 is coated with high reflective material and defines a connecting area 1046 at the periphery adjacent to the connecting side 1040. The connecting area 1046 is rectangular in shape.

The first supporting arm 100 is an elongated plate and includes a first pivoting end 1002, a first sliding end 1000, a first engaging surface 1003, and a first roller 1004. The first engaging surface 1003 defines a first cutout 1005 at the first pivoting end 1002. The first supporting arm 100 defines a first through hole 1006 at the first pivoting end 1002 where the first cutout 1005 is formed. The second supporting arm 101 is substantially similar to the first supporting arm 100 in shape and includes the counterparts of the first supporting arm 100, for example: a second pivoting end 1015, a second sliding end 1011, a second engaging surface 1013, a second roller 1014. The second engaging surface 1013 defines a second cutout 1015 at the second pivoting end 1012. The second supporting arm 101 defines a second through hole 1016 at the second pivoting end 1012.

Figure 3:
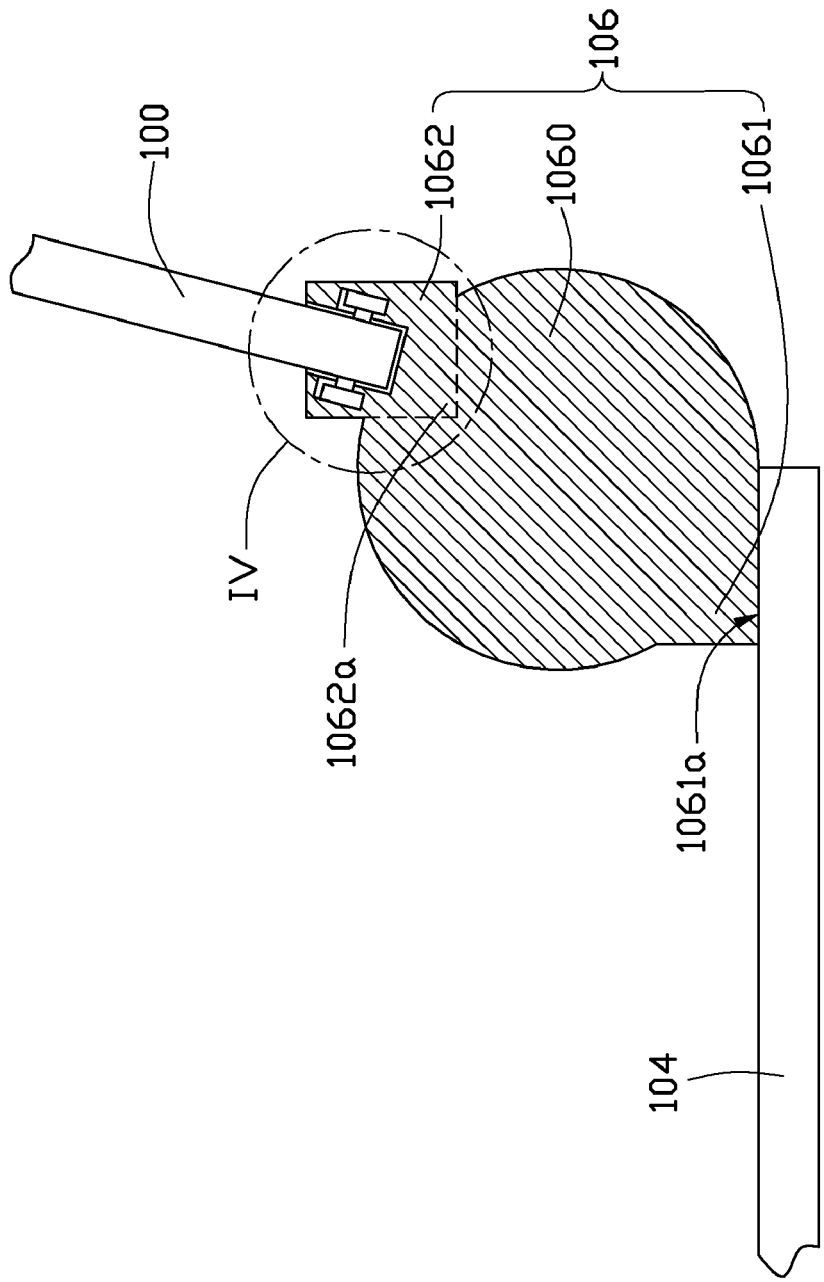
FIG. 3 is a cross-sectional, isometric view taken along the line II-II of FIG. 2.
Figure 4:
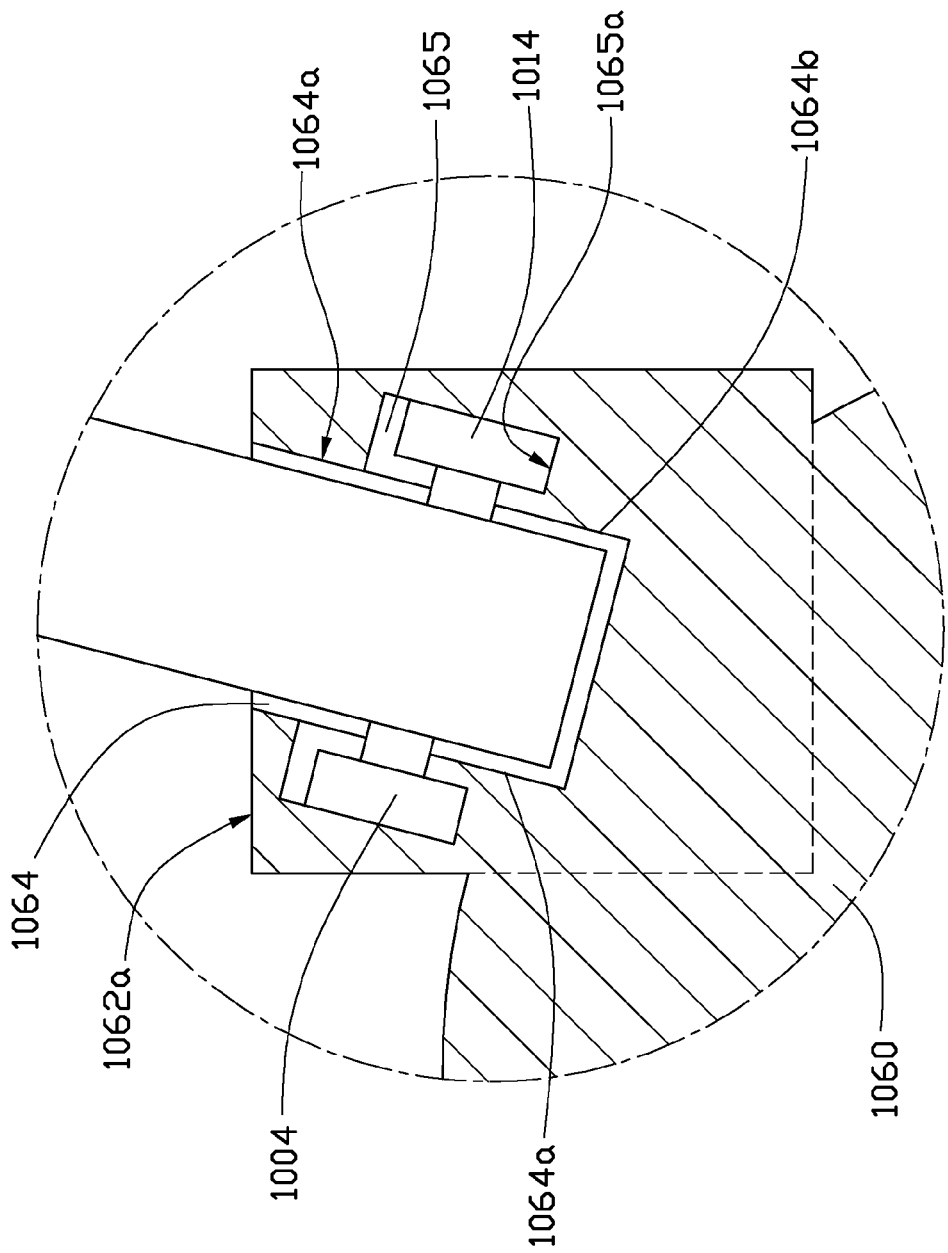
FIG. 4 is an enlarged view of a portion IV of FIG. 3.

Also referring to FIGS. 3 and 4, the supporting base 106 includes a main body 1060, a connecting part 1061, and a supporting part 1062. The main body 1060 is an elongated cylinder. The length of the main body 1060 is equal to the width of the writing board 104. The connecting part 1061 is generally a triangular rod equal in length to the connecting area 1046 and includes a side surface 1061a configured to be connected to the connecting area 1046 and another side surface (not shown) connected to the cylindrical surface of the main body 1060. In particular, the side surface 1061a for connecting to the connecting area 1046 is shaped and sized corresponding to the connecting area 1046. The connecting part 1061 is parallel to the main body 1060. The supporting part 1062 is generally a rectangular rod equal in length to the main body 1060 and has an edge portion 1062a incorporated into the main body 1060 opposite to the connecting part 1061. The supporting part 1062 is also parallel to the main body 1060. In this embodiment, the main body 1060, the connecting part 1061, and the supporting part 1062 are integrally formed.

The camera module 102 includes a connecting portion 1020 and a camera 1022. The camera 1022 includes a spherical end 1023. The connecting portion 1020 is a cylindrical tube. The connecting portion 1020 defines a receiving cavity 1020a at one end of the connecting portion 1020 and a threaded hole (not shown) at the other end of the connecting portion 1020.

The supporting part 1062 includes an upper surface 1062a parallel to the connecting surface 1061a. The supporting part 1062 defines a receiving groove 1064 in the upper surface 1062a. The receiving groove 1064 extends along the longitudinal direction of the main body 1060. The width of the receiving groove 1064 is greater than the width of the first supporting arm 100 or the second supporting arm 101. The receiving groove 1064 defines a pair of inner surfaces 1064a, which are parallel to each other. Each of the inner surfaces 1064a defines a sliding channel 1065 along the longitudinal direction of the main body 1060. Each of the sliding channels 1065 defines a bottom surface 1065a, a first positioning groove (not shown) on the bottom surface 1065a adjacent to the center part of the sliding channel 1065, and a second positioning groove (not shown) on the bottom surface 1065a adjacent to the distal end of the sliding channel 1065.

In assembly, the supporting base 106 is connected to the writing board 104 by connecting the connecting surface 1061a to the connecting area 1046. The first roller 1004 is rotatably connected to the first engaging surface 1003 adjacent to the first sliding end 1000. The second roller 1014 is rotatably connected to the second engaging surface 1013 adjacent to the second sliding end 1011. The first supporting arm 100 and the second supporting arm 101 are slidably engaged in the supporting base 106 with the first roller 1004 and the second roller 1014 slidably received in the sliding channels 1065. The first roller 1004 is received in one sliding channel 1065, and the second roller 1014 is received in the other sliding channel 1065.

The camera 1022 is rotatably connected to the connecting portion 1020 with the spherical end 1023 rotatably and fittingly received in the receiving cavity 1020a. The first through hole 1006 is aligned with the second through hole 1016. The first supporting arm 100 is pivotally connected to the second supporting arm 101 via the threaded bolt 1007 passing through the first through hole 1006 and the second through hole 1016. The camera module 102 is connected to the second supporting arm 101 via the threaded bolt 1007 being screwed into the threaded hole.

In use, the first supporting arm 100 and the second supporting arm 101 slide toward the center part of the sliding channels 1065. The first supporting arm 100 and the second supporting arm 101 are positioned by the first roller 1004 and the second roller 1014 sliding into the first positioning grooves adjacent to the center part of the sliding channels 1065. The camera module 102 is raised up by the first supporting arm 100 and the second supporting arm 101. The viewing angle of camera 1022 can be adjusted by rotating the camera 1022 about the connecting portion 1020.

Figure 5:
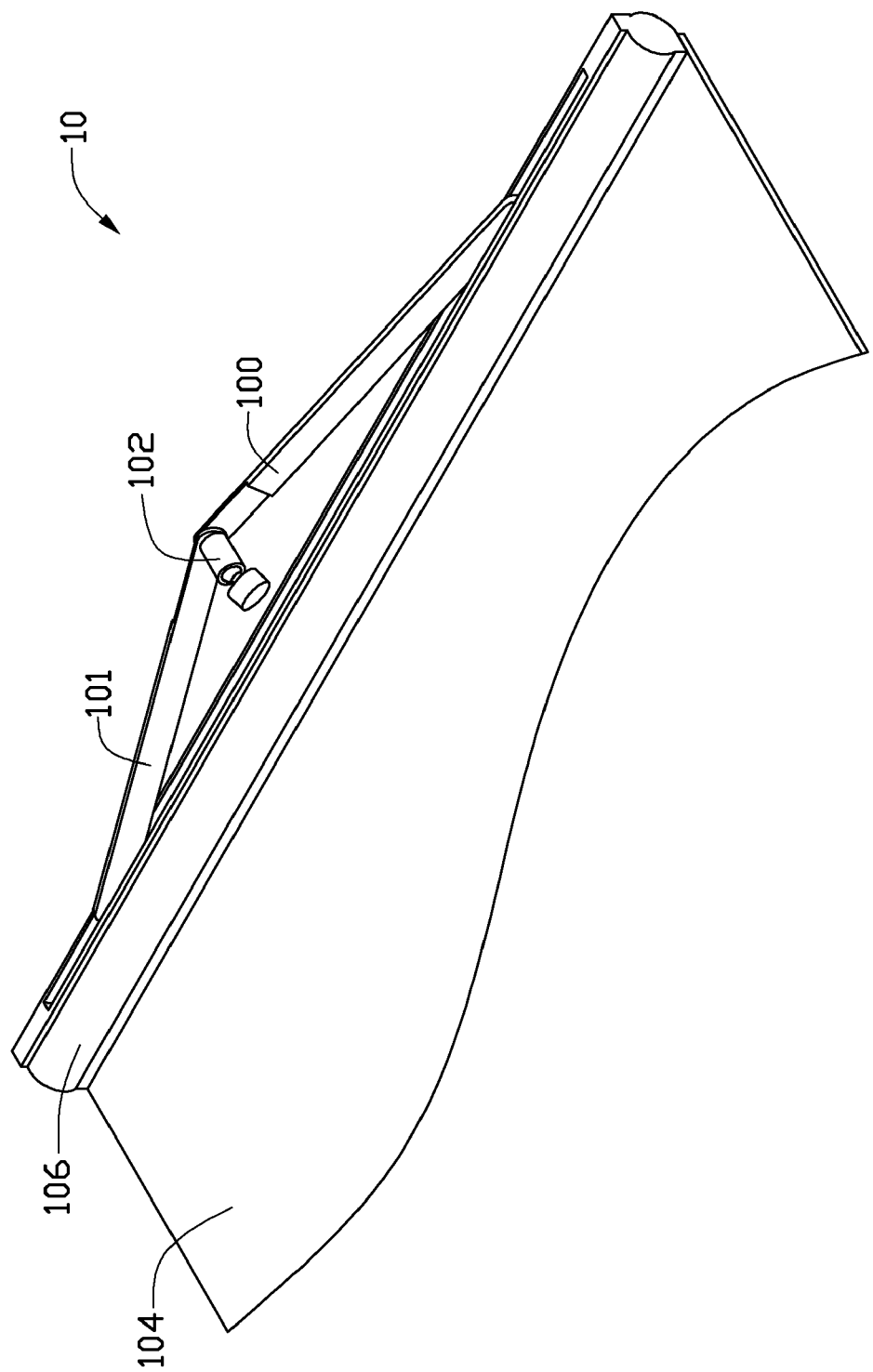
FIG. 5 is an assembled, isometric view of the handwriting device of FIG. 1 when the handwriting device is not in use.

Also referring to FIG. 5, when the handwriting device 10 is not in use, the first supporting arm 100 and the second supporting arm 101 slide away from each other until the first roller 1004 and second roller 1014 slide into the respective second positioning grooves adjacent to the distal ends of the sliding channels 1065. As such, the support device 103 is folded and the size of the handwriting device 10 is reduced to facilitate packing and transporting of the handwriting device 10.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A supporting device comprising:
a supporting base defining two sliding channels along the longitudinal direction of the supporting base;
a first supporting arm comprising a first pivoting end and a first sliding end, the first sliding end of the first supporting arm being slidably engaged in the sliding channels;
a second supporting arm comprising a second pivoting end and a second sliding end, the second sliding end of the second supporting arm being slidably engaged in the sliding channels, the first pivoting end and the second pivoting end being pivotally coupled to each other; and
wherein each of the first and second supporting arms is an elongated plate and further comprises an engaging surface, a cutout defined in the engaging surface at the first and second pivoting ends, and a through hole at each of the first and second pivoting ends where the cutout is formed, the through holes of the first and second supporting arms are aligned with each other, and the first and second supporting arms are rotatably connected with each other via a threaded bolt passing through the through holes of the first and second supporting arms.

2. The supporting device as claimed in claim 1, wherein the supporting base comprises a main body, and a supporting part, the supporting part is generally a rectangular rod equal in length to the main body and comprises an edge portion incorporated into the main body, the supporting part comprises an upper surface and defines a receiving groove in the upper surface, the receiving groove extends along the longitudinal direction of the main body, the width of the receiving groove is greater than the width of the first supporting arm or the second supporting arm, the receiving groove defines a pair of inner surfaces which are parallel to each other, and the inner surfaces define the sliding channels along the longitudinal direction of the main body.

3. The supporting device as claimed in claim 2, wherein each of the first and second supporting arms further comprises a roller, the rollers are rotatably connected to the engaging surfaces adjacent to the first and second sliding ends, and each of the first and second supporting arms is slidably connected to the supporting base with the rollers slidably received in the respective sliding channels.

4. A handwriting device comprising:
a writing board, the writing board comprising a writing surface and a connecting side, the writing surface defining a connecting area at a periphery thereof adjacent to the connecting side;
a supporting device connected to the writing board, the supporting device comprising:
a supporting base comprising a main body, a connecting part, and a supporting part, the main body being an elongated cylinder, the length of the main body being equal to the width of the writing board, the connecting part being generally a triangular rod equal in length to the connecting area and comprising a side surface being connected to the connecting area, the supporting part being generally a rectangular rod equal in length to the main body and comprising an edge portion incorporated into the main body, the supporting part comprising an upper surface and defining a receiving groove in the upper surface, the receiving groove extending along the longitudinal direction of the main body, the width of the receiving groove being greater than the width of one supporting arm, the receiving groove defining a pair of inner surfaces which are parallel to each other, the pair of inner surfaces defining two sliding channels along the longitudinal direction of the main body; and
two supporting arms, each of the supporting arms comprising a pivoting end and a sliding end, one of the sliding ends being slidably connected to one of the sliding channels, and the other one of the sliding ends being slidably connected to the other one of the sliding channels, the pivoting ends being rotatably connected to each other; and
a camera module connected to one of the pivoting ends and facing the writing board.

5. The handwriting device as claimed in claim 4, wherein the writing board is a rectangular plate, and the writing surface is coated with high reflective material.

6. The handwriting device as claimed in claim 5, wherein each of the supporting arms is an elongated plate and further comprises an engaging surface, a cutout is defined in the engaging surface at the pivoting ends, each of the supporting arms defines a through hole at the pivoting end where the cutout is formed, the through holes of the supporting arms are aligned with each other, and the supporting arms are rotatably connected with each other via a threaded bolt passing through the through holes of the first and second supporting arms.

7. The handwriting device as claimed in claim 6, wherein each of the supporting arms further comprises a roller, the rollers are rotatably connected to the engaging surfaces adjacent to the sliding ends, and each of the supporting arms is slidably connected to the supporting base with the rollers slidably received in the respective sliding channels.

8. The handwriting device as claimed in claim 6, wherein the camera module comprises a connecting portion and a camera, the camera comprises a spherical end, the connecting portion defines a receiving cavity at one end of the connecting portion, the camera is rotatably connected to the connecting portion with the spherical end rotatably and fittingly received in the receiving cavity, and the threaded bolt is connected to the other end of the connecting portion opposite to the receiving cavity after passing through the through holes of the supporting arms.

* * * * *